(12) United States Patent
Bray

(10) Patent No.: US 7,232,979 B2
(45) Date of Patent: Jun. 19, 2007

(54) OVEN LINER

(75) Inventor: Patrick Leon Bray, Hampshire (GB)

(73) Assignee: Cavity Protection Systems Ltd., Portsmouth, Hampshire (GB)

( * ) Notice: Subject to any disclaimer, the term of this patent is extended or adjusted under 35 U.S.C. 154(b) by 0 days.

(21) Appl. No.: 10/523,961

(22) PCT Filed: Aug. 4, 2003

(86) PCT No.: PCT/GB03/03411

§ 371 (c)(1),
(2), (4) Date: Nov. 17, 2005

(87) PCT Pub. No.: WO2004/014108

PCT Pub. Date: Feb. 12, 2004

(65) Prior Publication Data

US 2006/0151492 A1   Jul. 13, 2006

(30) Foreign Application Priority Data

Aug. 6, 2002 (GB) ................. 0218160.0
Mar. 17, 2003 (GB) ................. 0306010.0

(51) Int. Cl.
*H05B 6/80* (2006.01)
*F24C 15/00* (2006.01)

(52) U.S. Cl. .................. 219/756; 219/725; 219/392; 99/DIG. 14; 126/39 M

(58) Field of Classification Search ............... 219/725, 219/756, 757, 762, 391, 392; 126/39 M; 99/DIG. 14, 451; D7/351
See application file for complete search history.

(56) References Cited

U.S. PATENT DOCUMENTS

| | | | |
|---|---|---|---|
| 4,481,395 A | 11/1984 | Pangborn et al. | |
| 4,563,559 A | 1/1986 | Enami | |
| 4,778,968 A | 10/1988 | Torres | |
| 4,861,956 A * | 8/1989 | Courneya | 219/696 |
| 5,290,985 A | 3/1994 | Jancic et al. | |
| 5,512,737 A | 4/1996 | Miklos | |
| 6,137,097 A | 10/2000 | Hogan et al. | |
| D463,200 S * | 9/2002 | Choi | D7/351 |

* cited by examiner

*Primary Examiner*—Philip H. Leung
(74) *Attorney, Agent, or Firm*—Alfred A. Fressola; Ware, Fressola, Van Der Sluys & Adolpson LLP

(57) ABSTRACT

A microwave oven liner 11 is an injection moulding having a roof 12, a floor 14, a back 15 and two sides 16. The moulding is of food grade polypropylene, such that the liner can be washed in a commercial dishwasher. The liner is sized to be a sliding fit in a microwave oven. The roof is shorter 17 at the front than the floor to allow air circulation. Further, the roof is apertured, also for air circulation, with a series of small c. 4 mm bores 18 registering with the roof aperture 8. A lip 19 is provided across the front of the floor to retain split liquid. The external corners 20 are chamfered to clear the silicone seal 9 for instance. The floor has regularly pitched, 2 mm high ridges 21 running front to back. The ridges allow circulation of air beneath a container of food being heated in the oven having the liner.

16 Claims, 2 Drawing Sheets

OVEN LINER

CROSS REFERENCE TO RELATED APPLICATIONS

This application is for entry into the U.S. national phase under §371 for International Application No. PCT/GB03/003411 having an international filing date of Aug. 4, 2003, and from which priority is claimed under all applicable sections of Title 35 of the United States Code including, but not limited to, Sections 120, 363 and 365(c), and which in turn claims priority under 35 USC §119 to British Patent Application No. GB0306010.0 filed on Mar. 17, 2003, which in turn claims the priority of British Patent Application No. GB0218160.0 filed on Aug. 6, 2002.

TECHNICAL FIELD

The present invention relates to an oven liner, in particular a liner for a microwave oven.

BACKGROUND OF THE INVENTION

In commercial microwave ovens, which are most heavily used than domestic microwaves ovens, spits of food can become deposited around the oven, particularly on the inside walls of the oven. Unless these deposits are scrupulously cleaned off at the end of the day, they can build up to the extent that they desiccate and cause arcing and/or other damage. Subsequent repairs can be expensive.

Lightweight, disposable oven liners have been proposed. However, such a liner is of little practical use in a heavily used commercial oven.

SUMMARY OF THE INVENTION

The object of the present invention is to provide an improved microwave oven liner.

According to the invention there is provided a microwave oven liner comprising:
  a roof, a floor, a back and two sides, all being of food grade plastics material and of sufficient rigidity for automatic washing, the whole being sized to fit removably in a microwave oven.

Normally:
  the roof will be shorter at the front, which is open than the floor, to allow air to circulate for steam withdrawal from the oven, and
  the roof will be apertured for withdrawal of circulated air.

Preferably, the aperturing of the roof will be a series of holes acting as a coarse filter of spat food.

A particular feature of the preferred embodiment is an upstanding lip across the front of the floor, to retain spilt liquid.

A second preferred feature of the preferred embodiment is a series of ridges on the floor of the liner. Conveniently, the ridges extend from front to back. Preferably they are rounded, typically standing up to 5 mm high and usually being 2 mm high and being spaced between 5 mm and 20 mm apart and usually being 10 mm apart. The effect of these ridges is to raise a vessel containing food to be heated off the floor. Thus air is allowed to flow beneath the vessel. This helps to eliminate "hot spots".

It is also preferred that the floor of the liner should be slightly thicker than the sides, back and roof, which facilitates the ridging.

Conveniently, the outside corners between the roof and the other panels and the floor and the other panels are chamfered or rounded to allow ready insertion of the liner into the oven without interference with oven corner seals.

Whilst the liner can be of sheet bent and adhered together, it is preferably an injection moulding. Even when injection moulded, the liner may be of two parts, secured together as by laser welding.

Conveniently the plastics material of the liner is transparent or translucent. The preferred liner is of polypropylene or polycarbonate materials. However, it can be made of any material which is microwave safe, dishwasher safe, food safe and has a high flash point.

Preferably the material includes a fire retardant.

The liner is preferably transparent or translucent and it has been found that liners manufactured from clear polycarbonate are ideal.

BRIEF DESCRIPTION OF THE DRAWINGS

To help understanding of the invention, a two embodiments thereof will now be described by way of example and with reference to the accompanying drawings, in which.

DETAILED DESCRIPTION

Figure 1:
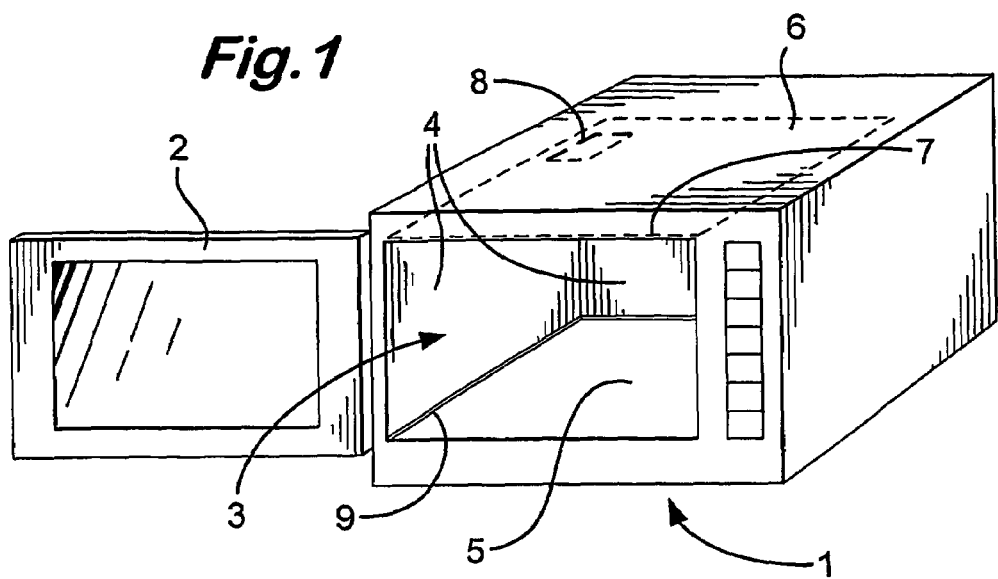
FIG. 1 is a perspective view of a conventional microwave oven.
Figure 2:
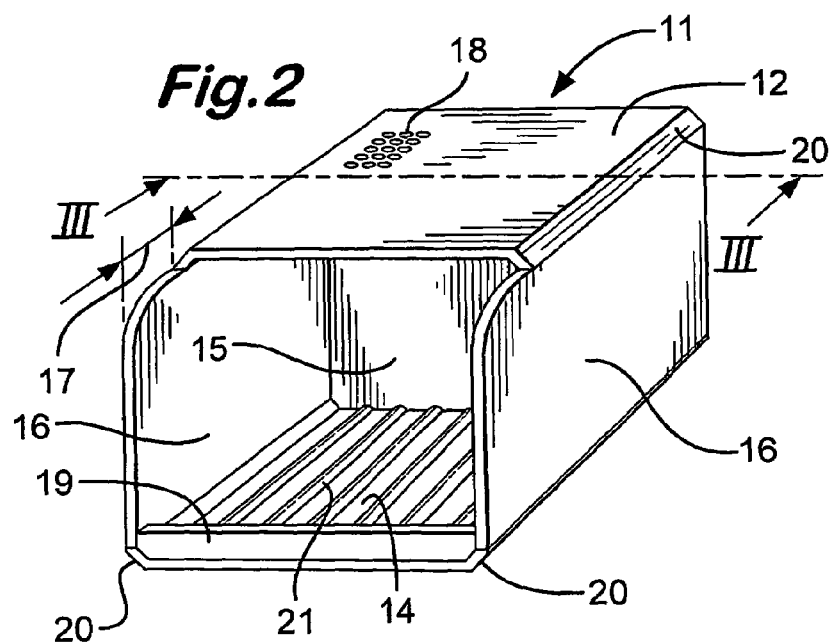
FIG. 2 is a similar view of a first liner of the invention sized to fit in the oven.
Figure 3:
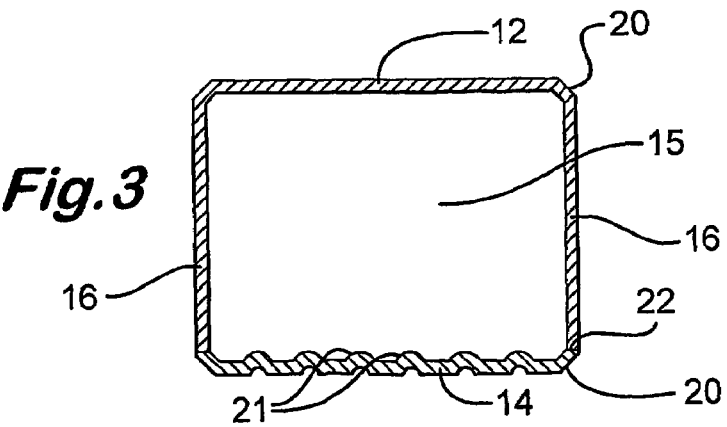
FIG. 3 is a cross-sectional front view showing ribbing of the floor of the oven liner on the plane III—III in FIG. 2.

Referring to FIGS. 1 to 3 of the drawings, a conventional microwave oven 1 has a glass panelled door 2 (shown open) with a cavity 3 lined with steel side and back walls 4, a ceramic floor 5 and a thin plastics moulding roof 6. A gap 7 is provided at the front between the door and the roof, whilst a further aperture 8 is provided in the roof. These are for air circulation by a non-shown fan. A silicon seal 9 seals the floor to the side walls. Non-shown microwave emitters and stirrers are provided above the roof and below the floor.

A liner 11 of the invention is an injection moulding of approximately 5 mm thick elements, namely:
  a roof 12,
  a floor 14,
  a back 15 and
  two sides 16.

The moulding is of food grade polypropylene, such that the liner can be washed in a commercial dishwasher.

The liner is sized to be a sliding fit in the oven. Due to its modest wall thickness, it reduces the capacity of the oven by a small amount only, yet is sufficiently rigid for washing.

The roof is shorter 17 at the front than the floor to allow air circulation. Further, the roof is apertured, also for air circulation, with a series of small c. 4 mm bores 18 registering with the roof aperture 8.

A lip 19 is provided across the front of the floor to retain split liquid.

The external corners 20 are chamfered to clear the silicone seal 9 for instance.

The floor has regularly pitched, 2 mm high ridges 21 running front to back. The ridges allow circulation of air beneath a container of food being heated in the oven having the liner.

As seen in FIG. 3, the floor is thicker material than the sides. To facilitate moulding, the floor is laser welded 22 to the sides.

Whilst it might have been be expected that the liner would de-grade the cooking performance of the oven, we have surprisingly found that no appreciable loss of performance is experienced when the liner is of 5 mm thick, food grade polypropylene.

Figure 4:
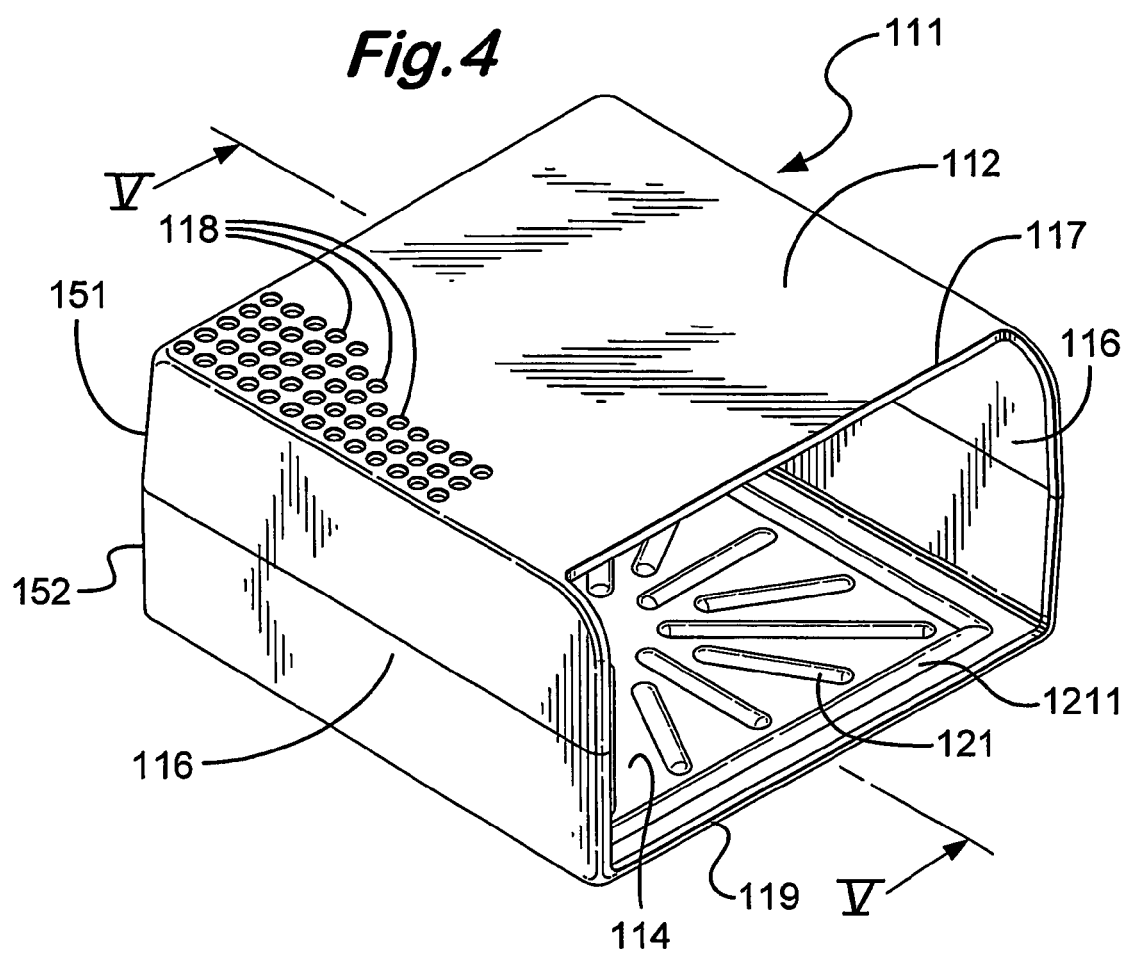
FIG. 4 is a view similar to FIG. 2 (from the opposite side) of an other oven liner of the invention.
Figure 5:
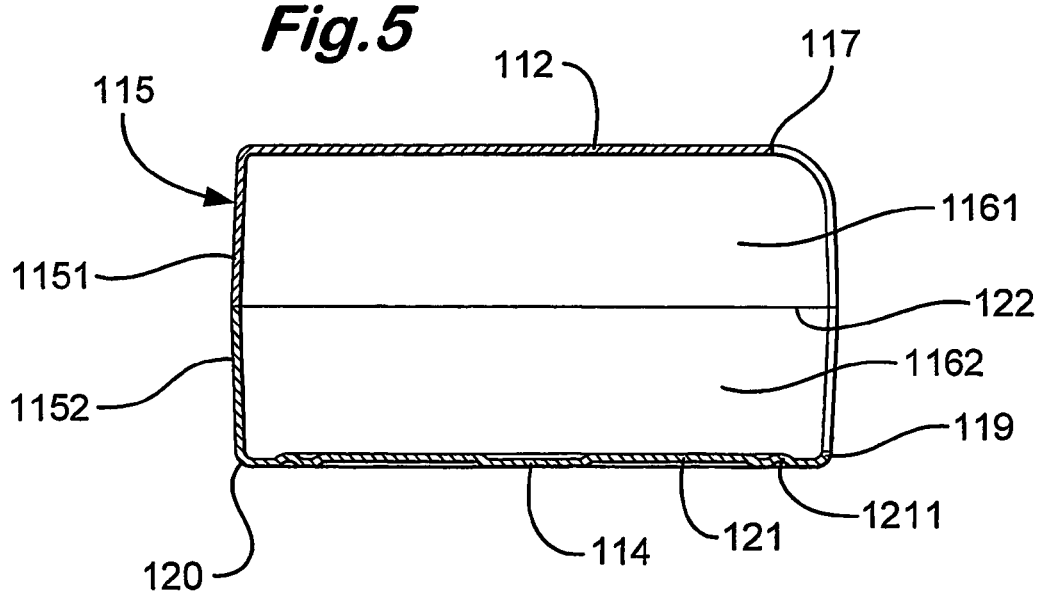
FIG. 5 is a cross-sectional view on the plane V—V in FIG. 4.

Turning on to FIGS. 4 and 5, a second liner 111 of the invention is injection moulded with approximately 5 mm thick elements, namely:

a roof 112,
a floor 114,
a back 115 and
two sides 116.

The liner is moulded of food grade polycarbonate, such that the liner can be washed in a commercial dishwasher.

The liner is moulded in two, upper and lower parts 151, 152. In their respective parts, the roof and the floor are essentially planar, with half sides 1161,1162 and halfbacks 1151,1152 extend at away at a suitable moulding taper. The result is that the lining is widest at mid-height, where the food to be cooked is likely to be widest and that the lining is slightly narrower at the roof and floor level, allowing clearance at the corners of the oven. The external corners 120 are rounded.

The two parts are butted together and laser welded 122. The actual process of welding forms no part of the invention as such.

As with the first embodiment, the roof is shorter 117 at the front than the floor to allow air circulation. Further, the roof is apertured, also for air circulation, with a series of small c. 10 mm bores 118 registering with the roof aperture of the oven.

A lip 119 is provided across the front of the floor to retain split liquid.

The floor has 2 mm high, regularly pitched, radial ridges 121. The ridges allow circulation of air beneath a container of food being heated in the oven having the liner. A further square-in-plan ridge 1211 extends around the distal ends of the radial ridges as a further split food retainer.

To ease cleaning and enhance appearance, the surfaces of the liners are provided with a mirror finish, by moulding in a highly polished mould tool.

The above described liners have the following advantages:

The microwave oven liners provide a cleaner and more effective use of a microwave oven. There are a number of practical advantages when a liner is used and these include.

1. The liner is easily removable and is dishwasher safe thereby providing quick and simple cleaning of the microwave oven. Use of the liner, particularly in a commercial dishwasher, avoids the lengthy manual cleaning of the cavity in a microwave oven.
2. If spillage of liquids occurs in the oven, the liner will prevent damage to the base—frequently of ceramic material—and the base seals of the microwave oven, the base being an expensive item to replace.
3. Use of the liner in a microwave oven prevents food contamination of the stirrer cover caused by spitting during the cooking of food.
4. The stirrer assemblies in the base, the roof, wave guide and the magnetrons are also protected from possible damage caused by the lack of cleaning the cavity and associated equipment in the microwave oven.
5. The use of the liner prevents arcing across residual food particles which are frequently missed under normal manual cleaning procedures.
6. The lens cover in a microwave oven is protected when a liner according to the invention is used. It is not unusual for steam from food to cause the lens lamp cover to become detached. This allows steam to exit the cavity onto the lamp holder. This can cause electrical arcing and burning of the lamp connector and wiring. Frequently grease can pass this way causing damage to other electrical components such as PC boards.
7. The lost time or "down time" of a microwave oven during busy periods is avoided while awaiting repairs.

What is claimed is:

1. A microwave oven liner comprising:
a roof,
a floor,
a back, and
two sides,
wherein said roof, floor, back and two sides are all fabricated from food grade plastics material and of sufficient rigidity for automatic washing,
said liner being sized to fit removably in a microwave oven, and
wherein the roof is shorter at the front than the floor and is configured to be open relative to the microwave ovens so as to allow air to circulate for steam withdrawal from the oven.

2. A microwave oven liner as claimed in claim 1, wherein the roof is apertured for withdrawal of circulated air.

3. A microwave oven liner as claimed in claim 2, wherein the aperturing of the roof is a series of holes acting as a coarse filter of spat food.

4. A microwave oven liner as claimed in claim 1, including an upstanding lip across the front of the floor, to retain spilt liquid.

5. A microwave oven liner as claimed in claim 1, including a series of ridges on the floor of the liner.

6. A microwave oven liner as claimed in claim 5, wherein the ridges stand up to 5 mm high.

7. A microwave oven liner as claimed in claim 1, wherein the ridges stand 2 mm high.

8. A microwave oven liner as claimed in claim 1, wherein outside corners between the roof and other panels and the floor and other panels are chamfered or rounded to allow ready insertion of the liner into the oven without interference with oven corner seals.

9. A microwave oven liner as claimed in claim 1, wherein the liner is of sheet bent and adhered together.

10. A microwave oven liner as claimed in claim 1, wherein the liner is injection moulded.

11. A microwave oven liner as claimed in claim 1, wherein the liner is of two or more two parts, welded together.

12. A microwave oven liner as claimed in claim 11, wherein the two parts are joined at mid-height, the back and sides tapering inwards to the floor and the roof from the joint.

13. A microwave oven liner as claimed in claim 1, wherein the liner has a mirror finish.

14. A microwave oven liner as claimed in claim 13, wherein the liner is transparent.

15. A microwave oven liner as claimed in claim 1, wherein the liner is of polycarbonate or polypropylene material.

16. A microwave oven liner as claimed in claim 15, wherein the material includes a fire retardant.

* * * * *

UNITED STATES PATENT AND TRADEMARK OFFICE
CERTIFICATE OF CORRECTION

PATENT NO.        : 7,232,979 B2                                              Page 1 of 1
APPLICATION NO.   : 10/523961
DATED             : June 19, 2007
INVENTOR(S)       : Bray It is certified that error appears in the above-identified patent and that said Letters Patent is hereby corrected as shown below:

Title Page, Item (57) Abstract, at line 10, please replace the word "split" with --spilt--.

At column 1, line 23, please replace the word "most" with --more--.

At column 2, line 58, please replace the word "split" with --spilt--.

At column 3, line 32, please replace the word "split" with --spilt--.

At column 3, line 37, please replace the word "split" with --spilt--.

At column 4, line 23, claim 1, line 13, please replace the word "ovens" with --oven--.

Signed and Sealed this

Twentieth Day of November, 2007

JON W. DUDAS
*Director of the United States Patent and Trademark Office*